US007088287B2

(12) United States Patent
Lee et al.

(10) Patent No.: US 7,088,287 B2
(45) Date of Patent: Aug. 8, 2006

(54) ANTENNA ALIGNING APPARATUS FOR NEAR-FIELD MEASUREMENT

(75) Inventors: Jeom-Hun Lee, Daejon (KR); Jong-Won Eun, Daejon (KR); Seong-Pal Lee, Daejon (KR)

(73) Assignee: Electronics and Telecommunications Research Institute (KR)

( * ) Notice: Subject to any disclaimer, the term of this patent is extended or adjusted under 35 U.S.C. 154(b) by 45 days.

(21) Appl. No.: 11/008,910

(22) Filed: Dec. 10, 2004

(65) Prior Publication Data

US 2005/0128137 A1 Jun. 16, 2005

(30) Foreign Application Priority Data

Dec. 11, 2003 (KR) ...................... 10-2003-0090288

(51) Int. Cl.
*G01S 7/40* (2006.01)

(52) U.S. Cl. ....................................... 342/174; 342/188

(58) Field of Classification Search ................ 342/165, 342/173, 174, 188

See application file for complete search history.

(56) References Cited

U.S. PATENT DOCUMENTS 4,864,315 A * 9/1989 Mohuchy .................... 343/703
5,365,241 A * 11/1994 Williams et al. ............ 343/703
6,208,287 B1 * 3/2001 Sikina et al. ............... 342/174
6,252,542 B1 * 6/2001 Sikina et al. ............... 342/174
2003/0013426 A1 * 1/2003 Kim et al. ............... 455/196.1
2005/0128137 A1 * 6/2005 Lee et al. .................... 342/174

FOREIGN PATENT DOCUMENTS

JP 08-211117 8/1996

OTHER PUBLICATIONS

"Reflector antennas for high power, near field elliptical spot beams with circular polarization", Brown, A.K.; Aitmehdi, R.; Antennas and Propagation, 1993., Eighth International Conference on 1993 pp. 600-602 vol. 1.*

"A Dual-Polarized Probe System For Near-Field Measurements", F. Larsen et al., 1979 IEEE, pp. 557-560.

* cited by examiner

*Primary Examiner*—John B. Sotomayor
(74) *Attorney, Agent, or Firm*—Blakely Sokoloff Taylor & Zafman

(57) ABSTRACT

Provided is an antenna aligning apparatus for near-field measurement, which can perform alignment between a measurement target antenna and a probe antenna precisely by using an antenna pattern and detecting coordinates of the least error. The antenna aligning apparatus includes: a receiving antenna, a signal dividing means, a vertical polarization port, a horizontal polarization port, a first amplitude/phase detector, a second amplitude/phase detector, a coordinate determining means for, and a position adjuster.

3 Claims, 3 Drawing Sheets

ANTENNA ALIGNING APPARATUS FOR NEAR-FIELD MEASUREMENT

FIELD OF THE INVENTION

The present invention relates to an antenna aligning apparatus for near-field measurement; and, more particularly, to an antenna aligning apparatus for near-field measurement which can perform alignment between a measurement target antenna and a probe antenna quickly and precisely for near-field measurement.

DESCRIPTION OF THE RELATED ART

Generally, alignment should be performed between a measurement target antenna, which will be referred to as a target antenna hereinafter, and a probe antenna to measure an antenna pattern in a near field. Any alignment error between the two antennas eventually causes an error in the near-field measurement of the antenna pattern.

The two antennas should be aligned to make their aperture planes be parallel to each other and the probe antenna is aligned to be located in the very center of the aperture plane of the target antenna. The probe antenna can be moved in the x-y plane and z axial directions and an elevation angle, an azimuth angle, and the z-axis of the target antenna can be moved by operating a driving motor.

The alignment of the two antennas is performed in the mechanical manner by using an optical tracer on the target antenna. However, this method takes a lot of cost and time.

To solve the problem, F. H. Larson suggests a technological solution in an article entitled "A Dual-Polarized System for Near-Field Measurement," IEEE AP-S, Volume 2, pp. 557–560, June, 1979.

Generally, a linear or circular polarization antenna is measured by aligning the target antenna and the probe antenna and then carrying out the measurement twice when the probe antenna is at 0° and 90°. However, the technology suggested by Larson utilizes a dual probe in order to resolve the trouble of measuring the pattern of the target antenna twice so that the measurement time can be reduced by half since the probe antenna does not need to be rotated at 90°.

Since the above technology, too, should perform mechanical alignment, it requires a lot of time and cost. Moreover, if there is an error or a change in the position of the antenna, the measurement should be performed again from the very first. It also has a problem that it requires much manpower to operate mechanical equipment.

SUMMARY OF THE INVENTION

It is, therefore, an object of the present invention to provide an antenna aligning apparatus for near-field measurement which can carry out alignment between a measurement target antenna, which will be referred to as a target antenna, and a probe antenna precisely by using the pattern of the target antenna and detecting coordinates of the least error.

In accordance with an aspect of the present invention, there is provided an apparatus for aligning antennas for near-field measurement, which includes: a probe antenna for receiving a signal transmitted from a measurement target antenna, which will be referred to as a target antenna herein; an orthomode transducer for dividing the signal received in the receiving antenna into a vertical polarization signal and a horizontal polarization signal; a vertical polarization port for receiving the vertical polarization signal from the orthomode transducer; a horizontal polarization port for receiving the horizontal polarization signal from the orthomode transducer; a first amplitude/phase detector for detecting an amplitude and phase of the signal transmitted from the vertical polarization port; a second amplitude/phase detector for detecting an amplitude and phase of the signal transmitted from the horizontal polarization port; a coordinate comparator for determining coordinates by comparing the amplitude and phase detected by the first amplitude/phase detector with the amplitude and phase detected by the second amplitude/phase detector based on the polarization of the target antenna; and a position adjuster for adjusting the position of the receiving antenna based on the coordinates determined in the coordinate comparator.

The present invention provides an antenna aligning apparatus which can perform precise alignment between the target antenna and the probe antenna by using the characteristics of the target antenna pattern and detecting coordinates of the least error.

The present invention takes an advantage of a characteristic that, if the target antenna and the probe antenna are aligned and the target antenna is a linear polarization antenna, the near-field measurement result shows that the maximum amplitude appears in the antenna aperture plane with respect to co-polarization and it shows null with respect to cross-polarization. The present invention, also, takes an advantage of a characteristic that, if the target antenna and the probe antenna are aligned and the target antenna is a circular polarization antenna, the same amplitude appears with respect to both co-polarization and cross-polarization and the phases has a 90° difference from each other.

BRIEF DESCRIPTION OF THE DRAWINGS

The above and other objects and features of the present invention will become apparent from the following description of the preferred embodiments given in conjunction with the accompanying drawings, in which.

DETAILED DESCRIPTION OF THE INVENTION

Other objects and aspects of the invention will become apparent from the following description of the embodiments with reference to the accompanying drawings, which is set forth hereinafter.

Figure 1:
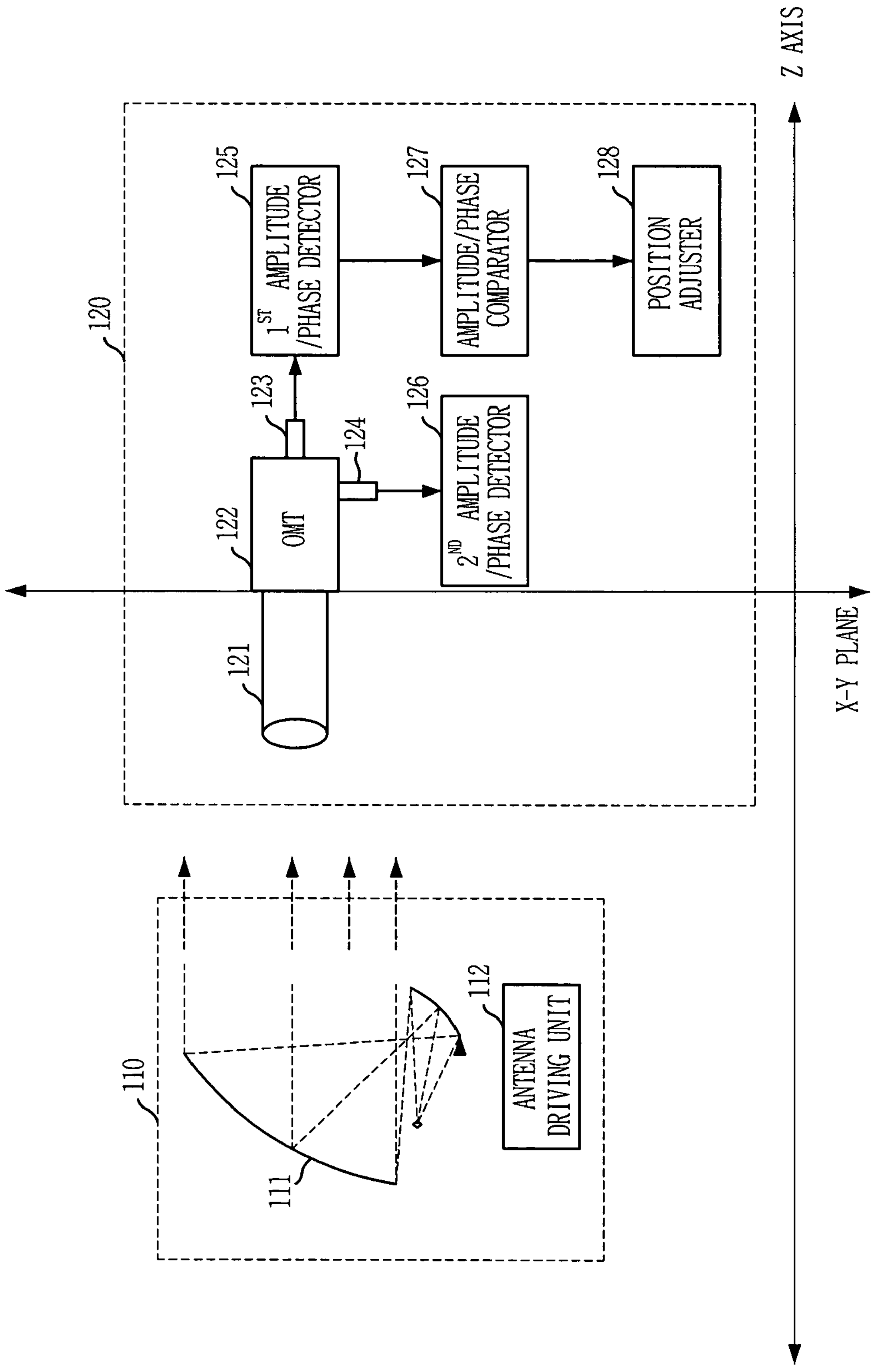
FIG. 1 is a block diagram illustrating an antenna aligning apparatus for near-field measurement in accordance with an embodiment of the present invention.

FIG. 1 is a block diagram illustrating an antenna aligning apparatus for near-field measurement in accordance with an embodiment of the present invention.

As shown, the antenna aligning apparatus 120 includes a probe antenna 121, an orthomode transducer 122, a vertical polarization port 123, a horizontal polarization port 124, a first amplitude/phase detector 125, a second amplitude/phase detector 126, an amplitude/phase comparator 127, and a position adjuster 128.

The probe antenna 121 receives a signal transmitted from a measurement target antenna 111, which will be simply referred to as a target antenna hereafter. The orthomode transducer (OMT) 122 divides the signal received in the probe antenna 121 into a vertical polarization signal and a horizontal polarization signal. The vertical polarization port 123 receives the vertical polarization signal obtained in the orthomode transducer 122, and the horizontal polarization port 124 receives the horizontal polarization signal obtained in the orthomode transducer 122. The first amplitude/phase detector 125 detects the amplitude and phase of the vertical polarization signal received from the vertical polarization port 123, and the second amplitude/phase detector 126 detects the amplitude and phase of the horizontal polarization signal received from the horizontal polarization port 124. The amplitude/phase comparator 127 determines coordinates by comparing the amplitude and phase detected in the first amplitude/phase detector 125 with the amplitude and phase detected in the second amplitude/phase detector 126 in order to align the probe antenna 121 according to the polarization of the target antenna. The position adjuster 128 adjusts the position of the probe antenna 121 based on the coordinates determined in the amplitude/phase comparator 127. Herein, the coordinates are placed as illustrated in FIG. 1.

A measurement transmitter 110 includes a target antenna 111 and an antenna driving unit 112.

The target antenna 111 can transmit plane wave or spherical wave to the antenna aligning apparatus of the present invention according to the shape of the target antenna. It can also transmit linear or circular polarization.

Figure 2:
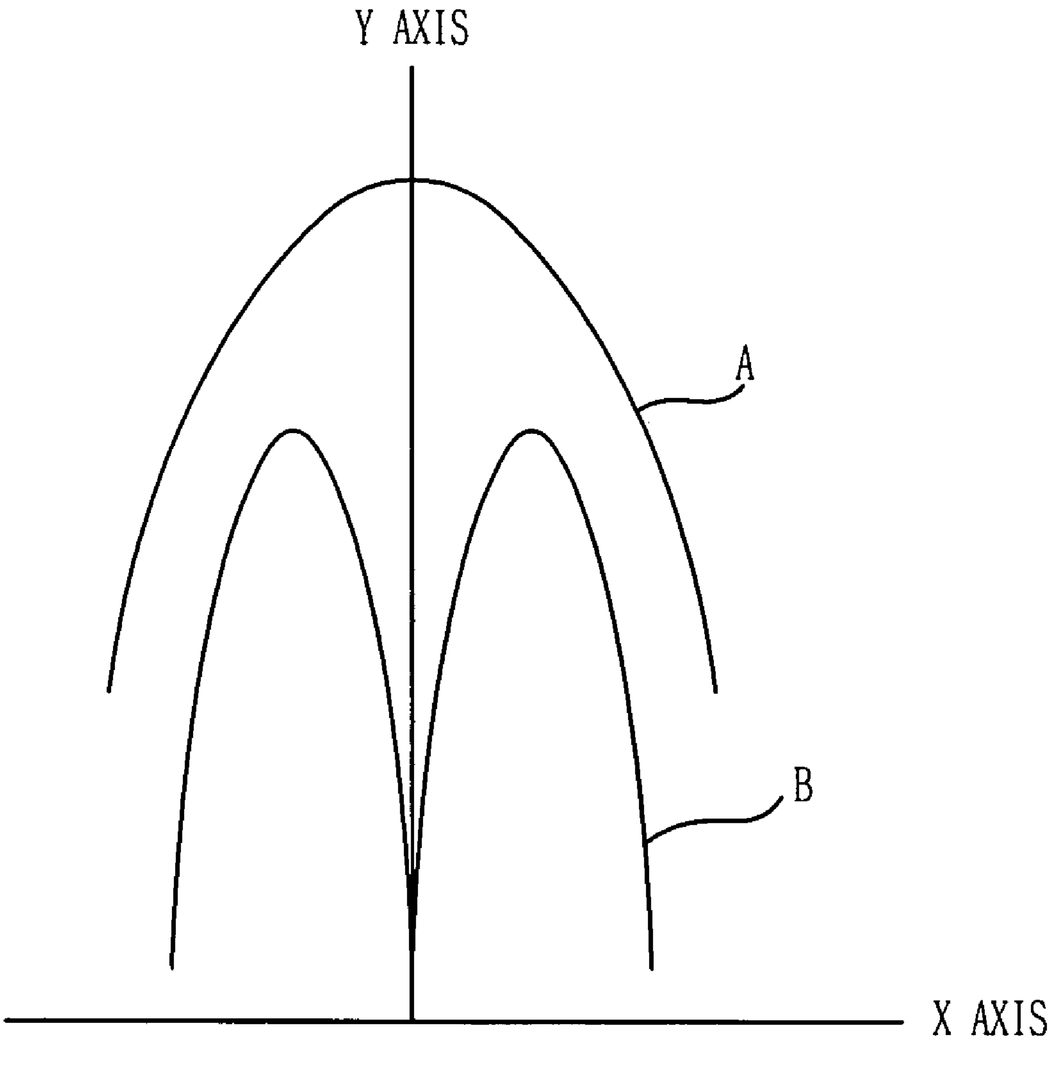
FIG. 2 is an exemplary diagram describing an amplitude characteristic based on a distance in a case where a measurement target antenna of FIG. 1 is a linear polarization antenna and the alignment of a probe antenna is ideal.
Figure 3:
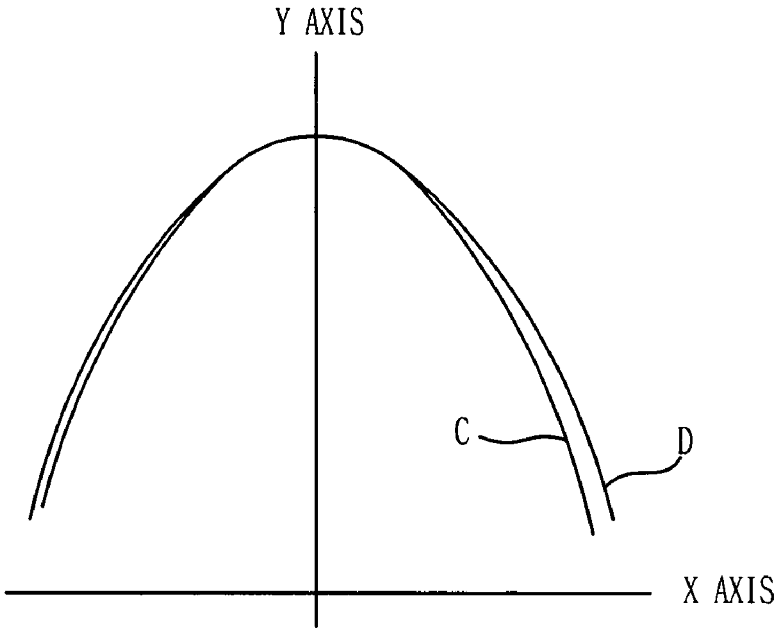
FIG. 3 is an exemplary diagram describing an amplitude characteristic based on a distance in a case where the measurement target antenna of FIG. 1 is a circular polarization antenna and the alignment of the probe antenna is ideal.
Figure 4:
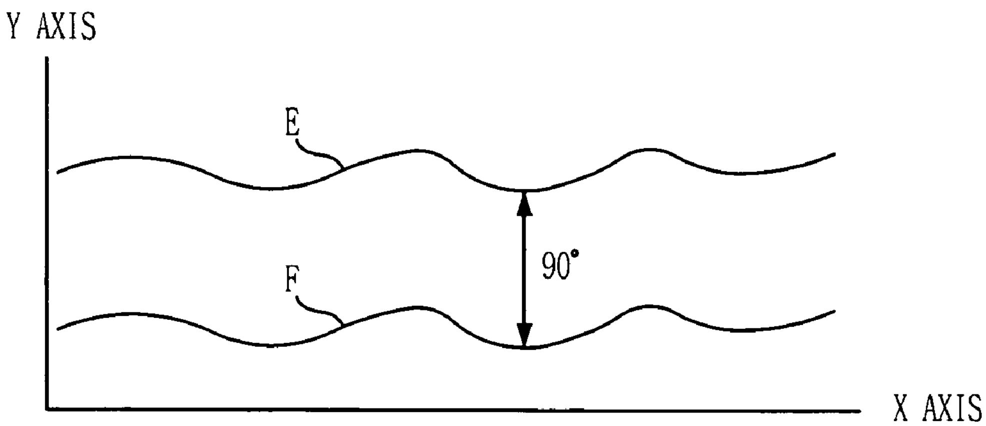
FIG. 4 is an exemplary diagram showing a phase characteristic based on a distance in a case where the measuring antenna of FIG. 1 is a circular polarization antenna and the alignment of the probe antenna is ideal.

FIGS. 2 to 4 show the amplitude characteristic based on the distance, when the antennas are aligned ideally.

FIG. 2 is an exemplary diagram describing an amplitude characteristic based on a distance in a case where a target antenna of FIG. 1 is a linear polarization antenna and the alignment of a probe antenna is ideal.

As shown, if the target antenna 111 is a linear polarization antenna and it is aligned with the probe antenna 121 ideally, 'A' is co-polarization of the polarization of the target antenna 111 and 'B' is cross-polarization of the polarization of the target antenna 111. A straight line connecting the maximum amplitude point of the co-polarization and a null point of the cross-polarization is parallel to the y-axis. Therefore, the points can be the alignment coordinates between the target antenna 111 and the probe antenna 121.

FIG. 3 is an exemplary diagram describing an amplitude characteristic based on a distance in a case where the target antenna of FIG. 1 is a circular polarization antenna and the alignment of the probe antenna is ideal. FIG. 4 is an exemplary diagram showing a phase characteristic based on a distance in a case where the target antenna of FIG. 1 is a circular polarization antenna and the alignment of the probe antenna is ideal.

As shown, if the target antenna 111 is a circular polarization antenna, the amplitudes in the vertical polarization port 123 and the horizontal polarization port 124 of FIG. 1 are 'C' and 'D,' respectively. The phase differences between the two polarization signals are 'E' and 'F,' respectively. In short, if the target antenna 111 is a circular polarization antenna, the amplitudes of the vertical polarization signal and the horizontal polarization signal are the same approximately and their phases have a phase difference of 90°.

The antenna aligning apparatus of the present invention detects the coordinates where the phase and amplitude characteristics are determined, which is shown in FIGS. 2 to 4. Hereafter, elements of FIG. 1 will be described in detail.

Referring to FIG. 1, the probe antenna 121 receives a signal transmitted from the target antenna 111, and the orthomode transducer 122 divides the signal received in the probe antenna 121 into vertical and horizontal polarization signals.

The vertical polarization port 123 and the horizontal polarization port 124 receive the vertical polarization signal and horizontal polarization signal divided by the orthomode transducer 122, individually.

The first and second amplitude and phase detectors 125 and 126 detect the amplitude and phase of the vertical polarization signal and the horizontal polarization signal transmitted from the vertical polarization port 123 and the horizontal polarization port 124.

If the target antenna 111 is a linear polarization antenna, the amplitude/phase comparator 127 determines points at which a straight line connecting the maximum amplitude point of the vertical polarization signal and a null point of the horizontal polarization signals is parallel to the y-axis.

Also, if the target antenna 111 is a circular polarization antenna, it determines coordinates at which the amplitudes of the vertical polarization signal and the horizontal polarization signal are the same and the signals have a phase difference of 90°. The position adjuster 128 adjusts the probe antenna 121 into the points determined by the amplitude/phase comparator 127.

The technology of the present invention measures two linear polarizations that are perpendicular to each other, i.e., co-polarization and cross-polarization, simultaneously by using a dual-polarized probe antenna. Thus, it can reduce rotation error and measuring time.

In addition, the technology of the present invention can perform antenna alignment efficiently by measuring the two linear polarizations simultaneously and performing electronic alignment.

The present application contains subject matter related to Korean patent application No. 2003-0090288, filed in the Korean Intellectual Property Office on Dec. 11, 2003, the entire contents of which is incorporated herein by reference.

While the present invention has been described with respect to certain preferred embodiments, it will be apparent to those skilled in the art that various changes and modifications may be made without departing from the scope of the invention as defined in the following claims.

What is claimed is:

1. An apparatus for aligning antennas for near-field measurement, comprising:

- a receiving antenna for receiving a signal transmitted from a measurement target antenna;
- a signal dividing means for dividing the signal received in the receiving antenna into a vertical polarization signal and a horizontal polarization signal;
- a vertical polarization receiving means for receiving the vertical polarization signal from the signal dividing means;
- a horizontal polarization receiving means for receiving the horizontal polarization signal from the signal dividing means;
- a first amplitude/phase detecting means for detecting an amplitude and phase of the vertical polarization signal;
- a second amplitude/phase detecting means for detecting an amplitude and phase of the horizontal polarization signal;

a coordinate determining means for determining coordinates by comparing the amplitude and phase detected by the first amplitude/phase detecting means with the amplitude and phase detected by the second amplitude/phase detecting means based on the polarization of the measurement target antenna; and a position adjuster for adjusting the position of the receiving antenna based on the coordinates determined in the coordinate determining means.

2. The apparatus as recited in claim 1, wherein, if the measurement target antenna is a linear polarization antenna, the coordinate determining means determines coordinates at which a straight line connecting the maximum amplitude point of a signal which is co-polarization of the measurement target antenna and a null point of a signal which is cross-polarization of the measurement target antenna is parallel to a y-axis as alignment coordinates, among the signals transmitted from the vertical polarization receiving means and the horizontal polarization receiving means through the first and second amplitude/phase detecting means.

3. The apparatus as recited in claim 1, wherein, if the measurement target antenna is a circular polarization antenna, the coordinate determining means determines coordinates at which the signals transmitted from the vertical polarization receiving means and the horizontal polarization receiving means through the first and second amplitude/phase detecting means have the same amplitude and have a phase difference of 90° as alignment coordinates.

* * * * *